Nov. 3, 1936.  B. COHN  2,059,554
METHOD OF MAKING BOTTLE CLOSURES
Filed Aug. 7, 1933
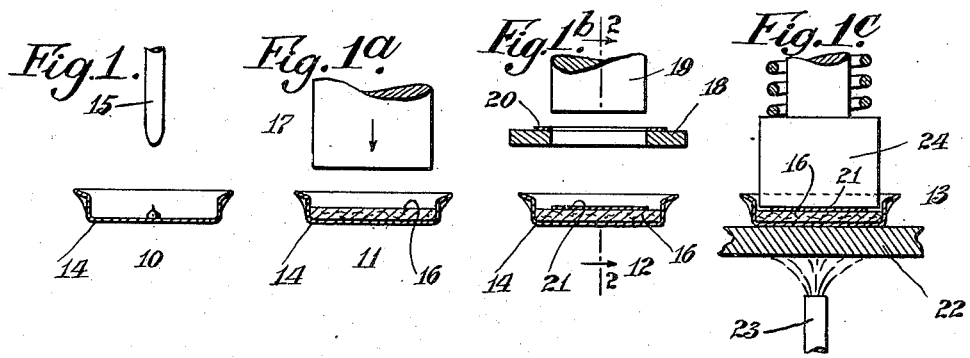
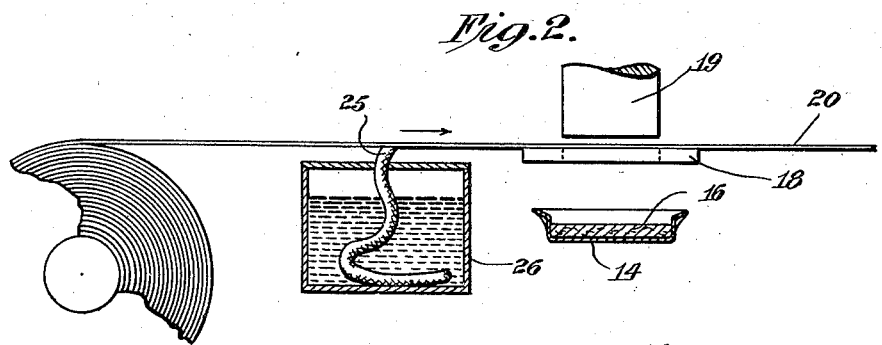
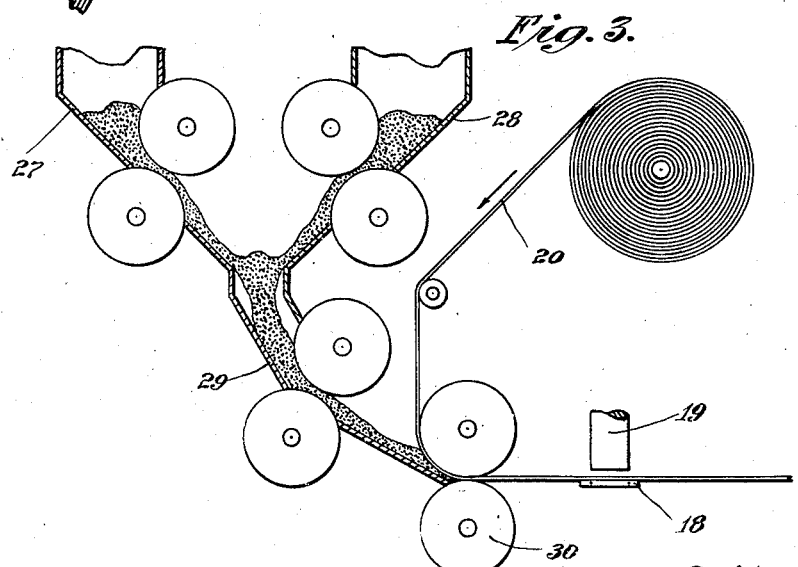
Benno Cohn
INVENTOR
BY Frank P. Wentworth
ATTORNEY Patented Nov. 3, 1936

2,059,554

UNITED STATES PATENT OFFICE 2,059,554

METHOD OF MAKING BOTTLE CLOSURES

Benno Cohn, Brooklyn, N. Y., assignor to Ferdinand Gutmann & Co., Brooklyn, N. Y., a corporation of New York Application August 7, 1933, Serial No. 684,012

10 Claims. (Cl. 113—80)

The invention relates to a method of making bottle closures, and more particularly to the production of a bottle cap of the "crown" type, the central portion of the cushion disk of which is provided with a protective facing disk.

Bottle caps of the type adapted to be produced by the method of the invention are well known in the art, and are generally designated as "center spot" caps to distinguish them from caps wherein the cushion disk is unprotected by a facing disk. Such caps are used in large quantities in the bottling of low priced beverages requiring sterilization after the application of the cap to the bottle, so that in their production, it is necessary to employ manufacturing methods involving a low production cost.

In Letters Patent No. 1,921,808, granted to me August 8th, 1933, I have described a method of producing caps of the type above referred to, in which all of the parts of the cap, including the facing disk, are assembled and bonded together by a continuous operation in one and the same assembling machine. This avoids the necessity for the re-handling of caps, such as is required when the application of a center protecting disk is by a machine separate from the machines used in assembling the metal shell and the cushion disk, which practice involves additional handling of the disks with its attendant cost and increased likelihood of the mutilation of the lithographic decorations upon the metal shell.

In my aforesaid application, various heat fusible cementing mediums for attaching the facing disk to the cushion disk are referred to, the use of such cementing mediums being old in various arts wherein the production of an article of manufacture requires the cutting of blanks from strip or sheet material having the adhesive thereon.

The strip of facing material from which the protecting disk is cut and immediately applied to the cushion disk of the cap, is in a roll, one surface of the strip having been previously coated or associated with the binding material. While the cementing or binding materials ordinarily used are required to be fusible at a slightly elevated temperature, it is desirable that the material used should not become tacky at normal room temperatures.

Heretofore great difficulty has been experienced in the use of such strip material during the summer season, because at high summer heat, a low fusing binding material or adhesive upon the strip is partially fused and succeeding convolutions of the strip while in the roll, are caused to adhere to each other to an extent to prevent the free running of the strip from the roll, or cause the separation of the adhesive from the strip material in a manner to interfere with the formation of a proper bond. Furthermore, the separation or stripping of the adhesive, or portions thereof, from one convolution, results in the presence of this adhesive upon the face of the next inner convolution of the strip, which in the finished cap is presented outwardly of the skirt.

The operation of the machine by which the spot is applied is interfered with when the free running of the strip from the roll is prevented. Furthermore, when the adhesive becomes tacky, from ordinary summer heat, the cutting dies cannot properly cut the disks from the strip, due in part to the drag of the tacky adhesive upon the cutting die members, and in part to the tendency of the die members to pick up adhesive in a manner to interfere with the cutting action thereof.

It has been heretofore generally conceded that it is essential with such old methods, in order that the center spot disks may be applied to the cushion disks of caps with sufficient rapidity to permit the production of such caps upon a commercial basis, that a low fusing, rapidly setting cement be used.

Softening of the heat fusible bonding cement at fairly low temperatures, however, tends toward a partial or complete destruction of the bond when the beverage within a bottle sealed with said caps, is undergoing sterilization so that the pressure adjacent the edge of the spot may cause the central portion of the spot to bulge away from the cushion disk, or extrude the cementing medium through the area of pressure from between the two disks in a manner to cause the center spot disk to adhere to a bottle with the removal of the cap. A bonding medium fusible at a low temperature deteriorates rapidly from heat or aging so that the center disk frequently falls from the cap upon the removal of the cap from a bottle.

While albuminous cements possess characteristics which prevent their becoming tacky at any room temperature, the use of such cements in bonding the facing disk to the cushion disk requires the application of the cement in a viscous form to the cork disk while it is within the metal shell. This makes the proper centering of the facing disk difficult. The strip of facing material cannot be coated with aluminous cements in a form sufficiently dry to permit the collection of the coated material in roll form.

With the above conditions in mind, I have provided a method of making bottle caps which permits the use of a binding material in assembling the various parts of the cap and adhering them to each other which, prior to the setting stage, possesses inherent characteristics precluding its becoming tacky at even abnormally high room temperatures, thus ensuring the free running of the strip of spotting material at all times and avoiding possibility of the fouling of the die members even after a long continued operation of an assembly machine.

In the method of the invention, the final operation by which the various parts of the cap are firmly bonded together is a combined heat and pressure stage, heat being used to ensure the setting of the cementing compound and pressure being used to assure the necessary intimate relation between the members during the reactions resulting in the setting of the compound.

In the practice of the method, it is possible to use strips of material from which the facing disks are cut, having applied thereto a thin coating of the bonding medium in a substantially dry state, or the material may have the bonding medium applied thereto in a plastic condition during the run of the material between the roll thereof and the cutting dies. The binding medium used is non-tacky at a temperature well above any temperature to which the prepared rolls of the facing strip may be subjected prior to their use upon the assembly machine. The temperatures required to make the bonding medium adhesive and cause it to set are well within the range of the temperatures required during sterilization of the contents of a bottle so that the heat of sterilization instead of weakening the bond between the facing disk and the cushion disk increases the effectiveness of such bond. Furthermore, in the method of the invention, the time interval during which heat and pressure must be applied to the cap to form an effective bond, is sufficiently short to permit production of the caps upon a commercial basis. This time interval is further reduced because the reactions resulting in the final setting of the bonding medium continue at normal temperatures after the cessation of the application of heat and pressure to the cap, the heat and pressure stage in the method causing merely what may be termed an "initial" bonding action, which bonding action becomes more effective with the lapse of time or as a result of the action of sterilization temperature thereon.

The invention consists primarily in a method of making bottle closures comprising the following steps in continuing succession: the application of a cementing medium which becomes tacky and hardens or sets under heat to a metal shell, the deposit within the shell upon said medium of a sealing gasket, the placing on the exposed face of the gasket of a facing disk having on the side thereof presented toward the gasket, a plastic binding medium which becomes tacky and hardens or sets under heat, and therefore applying continuing heat and pressure through said facing disk and said gasket to the cementing medium between said gasket and said shell and the binding medium between said facing disk and said gasket until said cementing medium and said binding medium have set; and in such other novel steps and practices as are hereinafter set forth and described, and more particularly pointed out in the claims hereto appended.

Referring to the drawing,

Figs. 1, 1a, 1b, and 1c, taken together, constitute a diagrammatic showing of the various stages in the practice of the method of the invention;

Fig. 2 is a transverse view on the line 2—2 of Fig. 1; and

Fig. 3 is a showing of an embodiment of the invention in which the binding medium is applied to the strip of material for the facing disks during the assembling operation.

Like numerals refer to like parts throughout the several views.

In producing bottle closures embodying the invention, it is necessary to adhere the cushion disk or sealing gasket to the metal shell and to adhere the facing disk to the cushion disk or sealing gasket so that each closure embodies therein a stratum of a material bonding the cushion disk to the metal shell and a stratum of material bonding the facing disk to the cushion disk or sealing gasket. To avoid confusion, the stratum of material bonding the cushion disk or sealing gasket to the metal shell will be referred to as a "cementing medium" and the stratum of bonding material between the facing disk and the cushion disk or sealing gasket will be referred to as a "binding medium". While the same material may be used in both strata, the cementing medium may be varied so long as it is of a character which becomes tacky and hardens or sets only upon the application of heat thereto.

As shown in Figs. 1 to 1c of the drawing, the method of the invention involves four stages, which are carried on in rapid succession, different closures being in these different stages during each cycle of the machine used, barring partial failure in the operation of that machine. The four stages referred to are numbered 10, 11, 12 and 13 in Figs. 1 to 1c of the drawing.

These figures being a diagrammatic showing, disclose a metal shell 14 and show this same shell in position at each of the stages. At stage 10, a suitable cementing medium is delivered by a dropper 15 upon the inner face of the top of the shell 14. This shell is then moved to the second stage, where a cushion disk or sealing gasket 16 is delivered by means of a plunger 17 within the shell and forced against the cementing medium deposited within the shell at the first stage 10. The shell with its contained gasket is then moved to stage 12, which is adjacent the members 18 and 19 of a cutting die mechanism adapted to cut disks from a strip of facing material 20 and force the disk 21 so cut from the strip against the cushion disk or sealing gasket 16 and position it centrally thereof. The facing disk 21 is of a diameter to expose sufficient of the cushion disk or sealing gasket 16 adjacent the skirt of the metal shell 14 to permit a sealing of a bottle directly against said disk 16.

One face of the strip 20, that presented toward the cushion disk or sealing gasket 16 when applying said facing disk thereto, is coated with a binding medium which is inherently non-tacky so as to permit a facing strip with the binding medium upon one face thereof to be formed into a roll without possibility of one convolution of the roll being adhered to an adjacent convolution thereof. This binding medium can be made tacky and caused to harden or set only at temperatures well above any room temperatures so that even when high summer temperatures prevail, the strip will run freely from the roll, and the die members 18 and 19 will be free from any drag because of the accumulation thereby of the binding medium during succeeding cutting operations. This ensures accuracy in the operation of these dies in cutting disks 21 from said strip.

The die members 18 and 19 are not heated, since with the material used for the binding medium, heating of the die members is unnecessary, and even if they were heated it would have no effect whatever upon the binding medium. This is due to the fact that three factors are necessary to cause the reaction necessary to bring the material of said binding medium to a condition where it will act as an adhesive, to wit: heat at an elevated temperature, continuing pressure during the application of heat thereto, and a time interval sufficient to ensure the necessary reactions or the initiation of said reactions.

The final stage 13 involves the applying of a continuing heat to the cementing medium and the binding medium while applying pressure through the facing disk and the gasket to the cementing medium between the gasket 16 and the shell 14, and the binding medium between the facing disk 21 and the gasket for a time interval sufficient to cause the effective bonding of the gasket 16 to the shell 14 and the facing disk 21 to the gasket 16.

In this stage 13, heat is applied to the metal shell 14, gasket 16 and the facing disk 21 as well as to the cementing medium and the binding medium through the plate 22 of a revolving drum such as is commonly used in bottle cap assembling machines, this plate being subjected to heat from the source 23. The pressure during this stage is applied through a heated spring pressed plunger 24 which is also commonly used in assembling machines. The method of heating the plunger 24 is immaterial. In such machines commonly in use, various expedients are employed to transmit heat through the plunger and the facing material to the binding medium, such devices ranging from a conduction of heat to the plungers through the metal of the machine adjacent same, which metal is heated by a gas flame; by a gas flame directed against the plungers, or by an electrical resistance element carried by the plungers. In the drawing, the first expedient is conventionally shown.

The successful practice of the method of the invention is dependent upon the constituents of the binding medium applied to the strip 20 of facing material.

One such binding medium embodies therein commercially pure rubber, a filler, a vulcanizing agent and an accelerator. A batch of the compound containing such constituents is composed of 200 parts of commercially pure rubber, Pará being satisfactory, 20 parts of zinc oxide as a filler, 4 parts of sulphur as a vulcanizing agent and 4 parts of oxy-normal-butyl-thio-carbonic-acid-disulphide as an accelerator. This compound, after a considerable length of time, will result in complete polymerization, but the time interval required is so great that the compound may be calendered upon a strip 20 of the facing material and the strip may be collected in a roll, without possibility of the reactions, necessary to cause the compound to act as an adhesive, occurring before the roll of strip is consumed. Hence, these rolls of strip may be produced in quantity and stored for possibly months under normal temperatures.

To cause vulcanization or partial vulcanization of the binding medium within a time interval which will permit a sufficiently rapid production of closures, it is essential, in stage 12 of the method, to apply to the coating of compound upon the strip, an accelerator which will ensure the rapid initiation of the vulcanization of the compound. If this accelerator were embodied in the compound, the vulcanization thereof, while the strip was in the roll, would occur so rapidly as to prevent the use of the strip of facing material in a roll.

The supplemental accelerator is dibenzylamine. A solution of this material consisting of 90 parts of dibenzylamine and 10 parts benzol is applied to the surface of the strip 20 of facing material as it is passing from the roll to the die members 18 and 19. Said supplemental accelerator, which is applied only superficially to the stratum of binding medium upon the strip of facing material, may be distributed throughout said surface by means of a wick 25 within a container 26 for the said solution.

In applying the supplemental accelerator by contact with a wick, it is impossible to preserve any exact proportions between this accelerator and the constituents of the compound used as a facing coating upon the strip.

The coating upon the strip is approximately .002 of an inch so that the supplemental accelerator will rapidly penetrate the compound and even if there is only a slight penetration and one which is not uniform, a sufficiently firm bond will be secured to ensure an adequate adhesion of the facing disk to the cushion disk.

If the same compound is used for adhering the cushion disk or sealing gasket 16 to the metal shell 14, it will be necessary to place the compound in solution in an equal quantity of benzol, deliver a drop within the shell 14 at the stage 10 and immediately thereafter apply thereto a drop of the supplemental accelerator before the insertion of the cushion disk 16 in the shell.

The ideal condition would be to include dibenzylamine in the compound calendered upon the strip 20 of facing material, since with this condition, the quantity of this accelerator used may be more accurately gauged than when moistening the compound already upon a strip therewith.

In Fig. 3 of the drawing, I have shown how this may be done. To permit this practice the compound is calendered upon the strip, while the latter is passing to the cutting dies 18 and 19. In order to secure the proper compound to be calendered upon the strip, I provide two batches, one of which is delivered to a mill 27 and the other of which is delivered to a mill 28. The batch in one of the mills, as 27, consists of 100 parts pure rubber, 10 parts zinc oxide, 4 parts sulphur, 4 parts oxy-normal-butyl-thiocarbonic-acid-disulphide. The batch in the mill 28 is composed of 100 parts pure rubber, 10 parts zinc oxide and 4 parts dibenzylamine. The product of the mills 27 and 28 is delivered to the mill 29 which mixes the two batches and delivers them to the spreader rollers 30 by which they are applied to one surface of the strip 20 of facing material, the facing disks being immediately thereafter cut from the coated strip and applied to the cushion disk 16 at stage 12.

The pressure applied in stage 13 may be as high as 20 or 30 pounds, the exact pressure being immaterial. The temperatures to which the closures are subjected while under pressure as described may range from 150° to 200° F., although a more elevated temperature may be used if desired. The time interval during which the closures are subjected to heat and pressure should be between 10 and 20 seconds, although there may be variation in this interval.

The compound used need not be subjected to heat for an interval necessary to ensure complete vulcanization of the rubber, it being merely necessary to initiate the reactions sufficiently to cause partial vulcanization of the opposite surfaces of the stratum of the binding medium. When this medium has attained a temperature to start vulcanization, it becomes sufficiently tacky to form a bond between the facing disk and the cushion disk and between the cushion disk or sealing gasket and the metal shell, if the compound used for adhering these latter parts together is a rubber compound herein referred to. If albuminous cements are used for cementing the cushion disk or sealing gasket within the metal shell, the same temperatures effective to set up the reactions in the rubber compound will cause an albuminous cement to coagulate and set. The time intervals required for setting the albuminous cement and for vulcanizing the rubber compound may differ as to each, but the prolongation of the application of heat with the albuminous cement has no deleterious action thereon.

After the reactions of the constituents of the rubber compound have once begun, it is unnecessary to continue the application of heat and pressure until complete vulcanization is effected, since with a lapse of time these reactions will continue without the presence of such heat or pressure.

The methods employed are particularly desirable when the bottle closures are to be used for sealing bottles containing beverages which after packaging are sterilized. It will be noted that the sterilization temperature is well within the range of the temperatures developed in stage 13 so that during sterilization of a capped bottle, the temperature employed, instead of tending to destroy the effectiveness of the bond between the facing disk and the cushion disk and between the latter and the metal shell, will merely accelerate the reactions of the various ingredients of the binding medium so as to increase the effectiveness of this bond.

While a binding medium herein disclosed is highly effective with a strip 20 of facing material consisting of a metal foil such as aluminum or tin, it may also be effectively used with strips of other facing material commonly used in the production of center spot caps.

It is not my intention to limit the invention to the precise time intervals, temperatures and the compound used as a binding medium, specified, it being apparent that such may be varied without departing from the spirit and scope of the invention.

Having described the invention, what I claim as new and desire to have protected by Letters Patent, is:—

1. The herein described method of making bottle closures comprising the following steps in continuing succession: the application of a cementing medium which becomes tacky and hardens or sets under heat to a metal shell, the deposit within the shell upon said medium of a sealing gasket, the placing on the exposed face of the gasket of a facing disk having on the side thereof presented toward the gasket, a plastic binding medium which becomes tacky and hardens or sets under heat, and thereafter applying continuing heat and pressure through said facing disk and said gasket to the cementing medium between said gasket and said shell and the binding medium between said facing disk and said gasket until said cementing medium and said binding medium have set.

2. The herein described method of making bottle closures comprising the following steps in continuing succession: the application of a cementing medium which becomes tacky and hardens or sets under heat to a metal shell, the deposit within the shell upon said medium of a sealing gasket, the feeding of a strip of facing material in relation to the exposed face of the gasket, said strip having on the face thereof presented toward the gasket a coating of a dry, plastic binding medium which becomes tacky and hardens or sets under heat, the application of a liquid agent to the coating upon said strip to set up reactions to make said coating tacky and accelerate the hardening or setting thereof, the cutting of a disk from said strip and its deposit upon the exposed face of the gasket, and thereafter applying continuing heat and pressure through said facing disk and said gasket to the cementing medium between said gasket and said shell and the binding medium between said facing disk and said gasket until said cementing medium and said binding medium have set.

3. The herein described method of making bottle closures comprising the following steps in continuing succession: the application of a cementing medium which becomes tacky and hardens or sets under heat to a metal shell, the deposit within the shell upon said medium of a sealing gasket, the placing on the exposed face of the gasket of a facing disk having on the side thereof presented toward the gasket, a plastic binding medium embodying therein rubber, a filler, a vulcanizing agent and an accelerator, and thereafter applying continuing heat and pressure through said facing disk and said gasket to the cementing medium between said gasket and said shell and the binding medium between said facing disk and said gasket until said cementing medium has set and said binding medium has undergone vulcanization.

4. The herein described method of making bottle closures comprising the following steps in continuing succession: the application of a cementing medium which becomes tacky and hardens or sets under heat to a metal shell, the deposit within the shell upon said medium of a sealing gasket, the feeding of a strip of facing material in relation to the exposed face of the gasket, said strip having on the face thereof presented toward the gasket, a plastic binding medium embodying therein rubber, a filler, a vulcanizing agent and an accelerator, the application of a supplemental accelerator to the coating upon said strip, the cutting of a disk from said strip and its deposit upon the exposed face of the gasket, and thereafter applying continuing heat and pressure through said facing disk and said gasket to the cementing medium between said gasket and said shell and the binding medium between said facing disk and said gasket until said cementing medium has set and said binding medium has undergone vulcanization.

5. The herein described method of making bottle closures comprising the following steps in continuing succession: the application of a cementing medium which becomes tacky and hardens or sets under heat to a metal shell, the deposit within the shell upon said medium of a sealing gasket, the placing on the exposed face of the gasket of a facing disk having on the side thereof presented toward the gasket, a plastic binding medium embodying therein a vulcanizable rubber compound containing substantially 200 parts of rubber, 20 parts of a filler, 4 parts of a vulcanizing agent and 4 parts of an accelerator, and thereafter applying continuing heat and pressure through said facing disk and said gasket to the cementing medium between said gasket and said shell and the binding medium between said facing disk and said gasket until said cementing medium has set and said binding medium has undergone vulcanization.

6. The herein described method of making bottle closures comprising the following steps in continuing succession: the application of a cementing medium which becomes tacky and hardens or sets under heat to a metal shell, the deposit within the shell upon said medium of a sealing gasket, the placing on the exposed face of the gasket of a facing disk having on the side thereof presented toward the gasket, a plastic binding medium embodying therein a vulcanizable rubber compound containing substantially 200 parts of rubber, 20 parts of zinc oxide, 4 parts of sulphur and 4 parts of oxy-normal-butyl-thiocarbonic-acid-disulphide, and thereafter applying continuing heat and pressure through said facing disk and said gasket to the cementing medium between said gasket and said shell and the binding medium between said facing disk and said gasket until said cementing medium has set and said binding medium has undergone vulcanization.

7. The herein described method of making bottle closures comprising the following steps in continuing succcession: the application of a cementing medium which becomes tacky and hardens or sets under heat to a metal shell, the deposit within the shell upon said medium of a sealing gasket, the feeding of a strip of facing material in relation to the exposed face of the gasket, said strip having on the face thereof presented toward the gasket, a plastic binding medium embodying therein 200 parts of rubber, 20 parts of zinc oxide, 4 parts of sulphur and 4 parts of oxy-normal-butyl-thiocarbonic-acid-disulphide, the application of a supplemental accelerator consisting of a solution of equal parts dibenzylamine and benzol to the coating upon said strip, the cutting of a disk from said strip and its deposit upon the exposed face of the gasket, and thereafter applying continuing heat and pressure through said facing disk and said gasket to the cementing medium between said gasket and said shell and the binding medium between said facing disk and said gasket until said cementing medium has set and said binding medium has undergone vulcanization.

8. The herein described method of making bottle closures comprising the following steps in continuing succession: the application of a cementing medium consisting of a rubber compound containing substantially 200 parts of rubber, 20 parts of a filler, 4 parts of a vulcanizing agent and 4 parts of an accelerator in solution in benzol admixed with a solution of equal parts of dibenzylamine and benzol to a metal shell, the deposit within the shell upon said medium of a sealing gasket, the feeding of a strip of facing material in relation to the exposed face of the gasket, said strip having on the face thereof presented toward the gasket, a binding medium embodying therein 200 parts of rubber, 20 parts of zinc oxide, 4 parts of sulphur and 4 parts of oxy-normal-butyl - thiocarbonic - acid - disulphide, the application of a supplemental accelerator consisting of a solution of equal parts of dibenzylamine and benzol to the coating upon said strip, the cutting of a disk from said strip and its deposit upon the exposed face of the gasket, and thereafter applying continuing heat and pressure through said facing disk and said gasket to the cementing medium between said gasket and said shell and the binding medium between said facing disk and said gasket until said cementing medium and said binding medium have undergone vulcanization.

9. The herein described method of making bottle closures comprising the following steps in continuing succession: the application of a cementing medium which becomes tacky and hardens or sets under heat to a metal shell, the deposit within the shell upon said medium of a sealing gasket, the feeding of a strip of facing material in relation to the exposed face of the gasket, the application to one surface of said strip during such feeding movement of a binding medium formed from two batches of rubber compounds admixed just prior to the application thereof to the strip, one of said batches containing substantially 100 parts of rubber, 10 parts of zinc oxide, 4 parts of sulphur and 4 parts of oxy-normal-butyl-thiocarbonic-acid-disulphide, and the other of said batches containing substantially 100 parts of rubber, 10 parts of zinc oxide and 4 parts of dibenzylamine, the cutting of a disk from said strip and its deposit upon the exposed face of the gasket, and thereafter applying continuing heat and pressure through said facing disk and said gasket to the cementing medium between said gasket and said shell and the binding medium between said facing disk and said gasket until said cementing medium has set and said binding medium has undergone vulcanization.

10. The herein described method of making bottle closures comprising the placin on the exposed face of a gasket within a metal shell of a facing disk having on the side thereof presented toward the gasket, a plastic binding medium which becomes tacky and hardens or sets under heat, and thereafter applying continuing heat and pressure through said facing disk to the binding medium between same and said gasket until said binding medium has been set.

BENNO COHN.